: US 10,074,182 B2
(45) Date of Patent: Sep. 11, 2018

(12) United States Patent
Faaland et al.

(54) PRESENTING MARKUP IN A SCENE USING DEPTH FADING

(71) Applicant: Microsoft Technology Licensing, LLC, Redmond, WA (US)

(72) Inventors: Nikolai Faaland, Sammamish, WA (US); David Buerer, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 106 days.

(21) Appl. No.: 14/223,614

(22) Filed: Mar. 24, 2014

(65) Prior Publication Data

US 2015/0130791 A1    May 14, 2015

Related U.S. Application Data

(60) Provisional application No. 61/904,438, filed on Nov. 14, 2013.

(51) Int. Cl.
*G06T 7/00* (2017.01)
*G06T 15/00* (2011.01)
*G06T 19/00* (2011.01)
*G06T 17/05* (2011.01)
(Continued)

(52) U.S. Cl.
CPC ........ *G06T 7/0051* (2013.01); *G01C 21/3635* (2013.01); *G06T 15/00* (2013.01); *G06T 17/05* (2013.01); *G06T 19/00* (2013.01); *G01C 21/3638* (2013.01); *G06K 9/00671* (2013.01);
(Continued)

(58) Field of Classification Search
None
See application file for complete search history.

(56) References Cited

U.S. PATENT DOCUMENTS

| 7,643,673 | B2 | 1/2010 | Rohlf et al. |
| 8,319,772 | B2 | 11/2012 | Fong et al. |
| 2003/0231190 | A1 | 12/2003 | Jawerth et al. |

(Continued)

FOREIGN PATENT DOCUMENTS

| CN | 101193298 A | 6/2008 |
| CN | 101207717 A | 6/2008 |
| WO | 2013061504 A1 | 5/2013 |

OTHER PUBLICATIONS

Krüger, Jens, Jens Schneider, and Rüdiger Westermann. "Clearview: An interactive context preserving hotspot visualization technique." Visualization and Computer Graphics, IEEE Transactions on 12.5 (2006): 941-948.*

(Continued)

*Primary Examiner* — Zhengxi Liu

(57) ABSTRACT

Architecture that enables the drawing of markup in a scene that neither obscures the scene nor is undesirably obscured by the scene. When drawing markup such as text, lines, and other graphics, into the scene, a determination is made as to the utility to the viewer of drawing the markup with greater prominence than an occluding scene object. The utility of the markup is based on the distance of the scene object and markup from the camera. Thus, if an object that appears small in the scene and is in front of the markup, the markup will be drawn more clearly, whereas if the same object appears large in the scene and is in front of the markup, the markup is rendered faint, if drawn at all.

20 Claims, 9 Drawing Sheets

(51) Int. Cl.
*G01C 21/36* (2006.01)
*G06K 9/00* (2006.01)
(52) U.S. Cl.
CPC .... *G06T 2210/62* (2013.01); *G06T 2219/004* (2013.01)

(56) References Cited

U.S. PATENT DOCUMENTS

| | | | |
|---|---|---|---|
| 2009/0087067 | A1 | 4/2009 | Khorasani |
| 2010/0123737 | A1 | 5/2010 | Williamson et al. |
| 2012/0299920 | A1 | 11/2012 | Coombe et al. |
| 2013/0147787 | A1 | 6/2013 | Ignatchenko et al. |
| 2013/0147911 | A1 | 6/2013 | Karsch et al. |
| 2014/0139560 | A1* | 5/2014 | Jung .................. G09G 5/10 345/690 |

OTHER PUBLICATIONS

Bell, Blaine, Steven Feiner, and Tobias Höllerer. "View management for virtual and augmented reality." Proceedings of the 14th annual ACM symposium on User interface software and technology. ACM, 2001.*
Unknown, "Ratios", retrieved from https://web.archive.org/web/20060301000000*/http://www.glencoe.com/sec/math/msmath/mac04/course1/study_guide/pdfs/mac1_pssg10.pdf on Dec. 10, 2017, archived from http://www.glencoe.com/sec/math/msmath/mac04/course1/study_guide/pdfs/mac1_pssg10.pdf on Jan. 17, 2006.*
Vaaraniemi, et al., "Enhancing the Visibility of Labels in 3D Navigation Maps", In Proceedings of Progress and New Trends in 3D Geoinformation Sciences, Sep. 30, 2013, 19 pages.
Vaaraniemi, et al., "Temporally Coherent Real-Time Labeling of Dynamic Scenes", In Proceedings of the 3rd International Conference on Computing for Geospatial Research and Applications, Jul. 2012, 10 pages.
Shen, et al., "On Point Feature Automatic Annotation Placement in 3D Environment", In Proceeding of the International Archives of the Photogrammetry, Remote Sensing and Spatial Information Sciences, vol. 37, Part B2, Jul. 3, 2008, 4 pages.
Maass, et al. "Embedded Labels for Line Features in Interactive 3D Virtual Environments", In Proceedings of the 5th International Conference on Computer Graphics, Virtual Reality, Visualisation and Interaction in Africa, Oct. 2007, 7 pages.
Gupta, et al., "Evaluating Annotation Techniques for 3D Models on Mobile Devices with Varying Zooming Levels", In Proceeding of the 38th Graphics Interface Conference at York University, May 28, 2012, 2 pages.
Elmqvist, et al., "Employing Dynamic Transparency for 3D Occlusion Management: Design Issues and Evaluation", In Proceedings of the 11th IFIP TC 13 International Conference on Human-Computer Interaction, Sep. 10, 2007, 14 pages.
Cipriano, et al., "Text Scaffolds for Effective Surface Labeling", In IEEE Transactions on Visualization and Computer Graphics, vol. 14, Issue 6, Nov. 2008, 8 pages.
"Google Earth User Guide", Retrieved on: Nov. 19, 2013, Available at: http://static.googleusercontent.com/media/earth.google.com/en//userguide/v4/google_earth_user_guide.pdf, 131 pages.
"Navteq Map", Retrieved on: Nov. 19, 2013, Available at: http://pic.dhe.ibm.com/infocenter/mashhelp/v3/index.jsp?topic=%2Fcom.ibm.help.mashups.creator.doc%2Fmash_w_navteq.html, 5 pages.
Bell, et al., "View Management for Virtual and Augmented Reality", In Proceedings of the 14th Annual ACM Symposium on User Interface Software and Technology, Nov. 11, 2001, 10 Pages.
Viola, et al., "Importance-Driven Volume Rendering", In Proceedings of IEEE Visualization, Oct. 10, 2004, 8 Pages.
"International Search Report and Written Opinion Issued in PCT Patent Application No. PCT/US2014/065102", dated: Apr. 1, 2015, 11 Pages.
PCT 2nd Written Opinion in International Application PCT/US2014/065102, dated Nov. 6, 2015, 5 pgs.
PCT International Preliminary Report on Patentability in International Application PCT/US2014/065102, dated Feb. 5, 2016, 6 pgs.
"Office Action and Search Report Issued in Chinese Patent Application No. 201480062136.3", dated Mar. 9, 2018, 14 Pages.

* cited by examiner

PRESENTING MARKUP IN A SCENE USING DEPTH FADING

CROSS-REFERENCE TO RELATED APPLICATIONS

This application claims the benefit of U.S. Provisional Patent application Ser. No. 61/904,438 entitled "PRESENTING MARKUP IN A SCENE USING DEPTH FADING" and filed Nov. 14, 2013, the entirety of which is incorporated by reference herein.

BACKGROUND

The capability to provide a richer user experience in visuals such as maps can be a competitive edge for manufacturers. This capability may include the rendering of text and other shapes (collectively referred to as markup) in a scene. Typically, this is handled either by drawing the markup and letting it obscure the scene in some way or trying to draw the markup entirely in the scene, in which case the markup can be obscured by parts of the scene. In multi-dimensional renderings such as three-dimension (3D), a problem exists as to how to draw the markup into the 3D scene in such a way that the markup is both visible and yet not obscuring the scene or any parts thereof.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables the drawing (or rendering) of markup (also referred to as markup objects) in a scene (e.g., three-dimensional (3D)) that neither obscures the scene (understood to be or comprise scene object(s), which can be natural and/or manmade, and include text, lines, and/or graphics included as part of the original scene without the markup applied) nor is undesirably obscured by the scene (scene object(s)). In general, the architecture operates to determine the utility to the user in seeing a given piece of markup and/or scene object. This is determined by computing current contributions of the markup objects and associated scene objects in the scene, and based on these contributions, determining which contribution provide greater utility (or importance) to the user experience, and then applying the desired depth fading to the objects and/or markup to enable the optimum utility to the user.

It is to be understood that the level of fading can be applied in at least two different techniques: only to the markup, only to the occluding scene object, or to both the markup and the occluding scene object. While the description herein may focus on one technique, it is to be appreciated the description is not so limited. In operation, all scene objects are drawn at full opacity into a standard buffer. The markup is then drawn on top of the scene into the same buffer, while fading pixels as needed. Drawing a fully opaque markup pixel on top of a fully opaque scene object is equivalent in result to drawing the scene object at that pixel with zero opacity. Similarly, a partially faded markup pixel drawn on top of an opaque object looks similar to if the object had been faded instead.

When the scene is zoomed out, such that the scene objects are more difficult to discern, the user will likely want to see the markup in a more prominent and distinct fashion, rather than potentially unidentifiable scene objects such as buildings, since the scene objects are much smaller and more plentiful in the overall scene. Thus, the utility to the user is to draw identifiable and readable markup, and the user/viewer is presented a more informative way of identifying where and what the user is viewing (e.g., for a geographical map). In this case the markup pixels will be drawn with near to full opacity. This is referred to as the computed markup contribution being greater in utility (or importance) to the user than the scene contribution.

In contrast, when the scene is zoomed in, the user will likely want to see the scene objects clearly and distinctly, and less or no markup behind the occluding pixels of the scene object, since the user is more oriented to the location, and thus, the markup object will be drawn with greater depth fading (less opacity). In other words, the utility to the user is to see the scene object pixels with near to full opacity. This is referred to as the scene object contribution being greater in utility (more important) to the user than the markup contribution, and hence, the architecture compensates by drawing the occluded pixels of the markup with reduced or zero opacity in the presentation of the scene.

The contributions are computed on a per pixel basis of pixels of the obscuring object (the scene object in front of the markup) and pixels of the obscured object (e.g., the markup).

These contributions are visualized to the user by drawing the markup and/or scene object with levels of depth fading appropriate for the given objects (scene and/or markup), if using any fading at all. This enables the annotation of a 3D scene (e.g., with text, lines, graphics, etc., as markup objects) without obscuring scene content and/or markup placed into the scene, any of which is desired to be perceived.

Markup can be described as any object(s) (also referred to as "markup objects") not originally in a given scene, but placed into the scene (e.g., a map), and that assist the user in understanding aspects of the scene. For example, the markup can include, but is not limited to, text placed (positioned) on a road that identifies the road name, restricted direction of travel, and status of the road (e.g., under construction, accident, traffic blocked or slow, etc.). The markup can be lines superimposed on roads and routes that the user will travel or is suggested to travel (e.g., wide lines inserted over roads, streets, routes, etc.) for a particular purpose. The markup can also be non-text and non-line objects such as buildings and other graphics (natural and/or manmade).

The architecture applies not only to terrestrial scenes having markup (markup applied to a terrestrial scene such as map) and terrestrial scene objects, but also to aerial scenes that employ markup (e.g., aerial markup such as a cloud tag, flying object tag, etc.) relative to aerial objects such as clouds, planes, flying entities (e.g., birds), planets, constellations, other aerial markup, and so on. Regardless of the type of markup, the architecture performs drawing of the markup and scene object(s) on a per pixel basis.

When drawing markup objects such as text, lines, and other graphics into the scene, a determination is made as to where to first establish the markup location in 3D space of the scene. The disclosed architecture may receive a scene with the markup already applied, but then operates to draw the markup with depth fading, based on the utility metric for the user and the camera view (e.g., change of zoom levels).

Based on the location of the markup in the scene and relative to scene objects, the architecture computes the contributions as to the utility to the user of the markup and occluding scene object(s). The contribution utility metric can be a computation of distance ratios or percentages, for example.

If a scene object and markup appear distant from the camera with the object in front of the markup, the overall distance from the camera may be such that the markup contribution is computed to be more important or of greater utility to the user than the scene contribution, and the markup will be drawn prominently and visually readable by applying depth fading (less opacity or near to full transparency) to the occluding scene object pixels to enable the markup to appear prominent. In contrast, if the same objects (scene and markup) appear closer to the camera (e.g., zoomed in) and the scene object is again in front of the markup, the scene object pixels are rendered near or at full opacity (opaque) thereby occluding all or portions of markup.

In terms of a per-pixel basis, a first pass is made to determine distances of pixels for occluding objects (e.g., buildings, terrain, etc.) associated with markup related to the position/location of the camera. A second pass draws the potentially occluded objects—the markup, into the scene. If the markup pixel is not occluded by an object pixel, the markup pixel is drawn (e.g., opaque). If the markup pixel is occluded by a pixel of a scene object, the contributions are computed based on pixel distances (markup pixel and/or occluding object pixel) to the camera, or according to other ways such as the distance of the occluding pixel to the occluded pixel.

There may be any number of different ways in which to compute the contributions of the markup object and the scene object, such as ratios, that consider generally the distance to the camera, or a value defined by distance between the occluding object and the markup divided by the distance to camera from the occluding object. For example, for scene object pixels in front of some or all of the markup object pixels, the distance from an occluding pixel to the markup pixel (occluded pixel) can be computed, and then this distance value compared to the distance of the occluding pixel (or the markup pixel) to the camera (the view from the observer), as a ratio. Thus, the computed contributions essentially establish the utility that is to be rendered to the user.

Consider an example where the distance from an occluding pixel of a scene object to a markup pixel, along direct line-of-sight from the camera, is five meters (or some quantity)—the occluded markup is five meters behind the occluding scene object pixels. Further assume the distance from an occluding pixel to the camera is five hundred meters (or some value of a corresponding measurement system). The ratio is then 5:500 (a large ratio differential), or can be computed as a value of $5/500=0.01$ (a comparative value), as compared to some threshold value or incremental setting (controlled programmatically), and which indicates the amount of scene matter blocking the user's view of the markup. Thus, since the ratio is large, the distance from the camera is significant and the markup is drawn clearly (the occluded pixels of the markup object are drawn with near to full opacity) for the viewer, to provide the utility to the viewer as the user will likely want to see the markup rather than the object from this distance, on a map, for example.

If this ratio is "large" (the ratio differential is large, or the comparative value is small) based on the greater camera distance, then the markup contribution is of greater utility to the user. Accordingly, the user will likely want to see the markup instead of the scene object, so the occluded pixels of the markup object are drawn with near or full opacity (the occluding pixels of the scene object, while retained at full opacity are overdrawn with the full opacity pixels of the markup).

Continuing with the above example where the distance from an occluding pixel and a markup (occluded) pixel remains at five meters, consider now the distance to the camera is reduced to one hundred meters (or some value of a corresponding measurement system). The ratio is then 5:50 (a smaller ratio differential) or can be computed as a comparative value of $5/50=0.1$, a value ten times larger than before. Thus, the scene now appears to be more zoomed in (the scene objects and markup appear much closer to the viewer/camera). If the ratio (amount or comparative value) is small, the markup and occluding object are closer to the camera and the scene contribution is of greater utility (importance) to the user than the markup contribution; hence, the occluded pixels of the markup object are drawn with little or no opacity, thereby appearing to the user as obscuring the markup pixels nearly entirely or entirely.

Thus, if a scene object and markup appear distant in the scene and the scene object is in front of the markup, the markup contribution relative to the scene contribution may be of greater utility (or importance) to the user, and hence, the markup will be drawn more clearly. If the same object and markup appear close in the scene and the scene object is in front of the markup, the scene contribution is of greater utility (or importance) to the user than the markup contribution, and hence, markup is rendered faint, if drawn at all.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
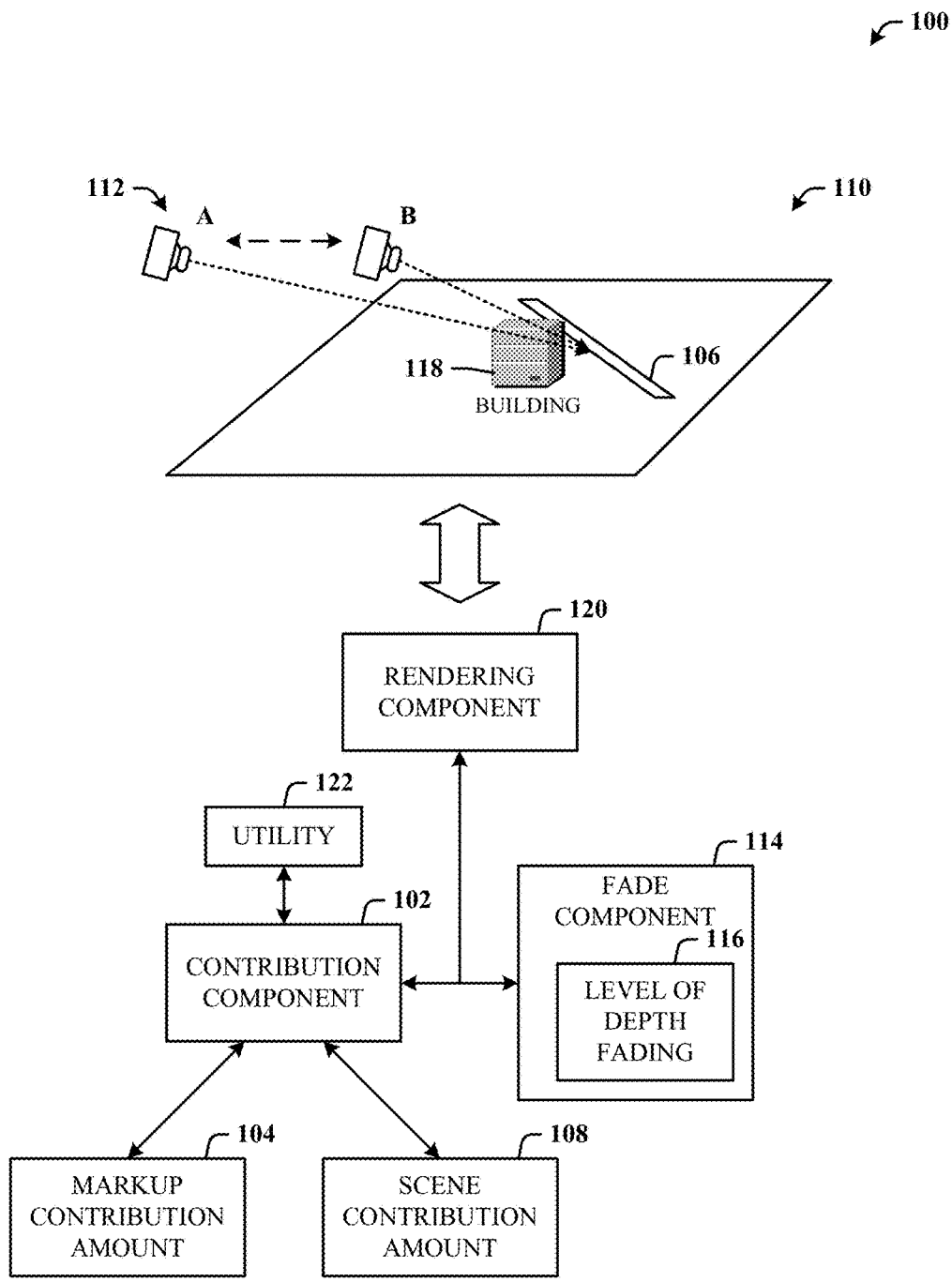
FIG. 1 illustrates a system in accordance with the disclosed architecture.

A problem exists with determining how to draw text and other shapes (referred to as "markup") into a three-dimensional (3D) scene in such a way that the text and shapes are both visible and yet not obscuring the scene or being obscured by the scene. Typically, this is handled conventionally either by outright drawing the markup and letting the markup obscure the scene or trying to draw the markup entirely in the scene, in which case the markup can be obscured by parts of the scene.

In order to draw markup that neither obscures the scene nor is undesirably obscured by the scene, the disclosed architecture provides a way to determine (e.g., per-pixel) the utility to the user that the markup contributes versus the utility to the user that the scene contributes. This provides a way to draw a 3D scene and markup without obscuring what is desired to be made informative to the viewer.

When drawing markup such as text, lines, and other graphics, into a scene, a determination is made as to where to first establish the markup to be in 3D space of the scene. Then, per pixel, the markup pixel is drawn unless the markup pixel would be obscured by the scene. If the markup pixel is obscured, then the distance from the obscuring pixel (of the scene object) to the markup pixel is computed and compared to the distance from the obscuring pixel to the camera (the view from the observer).

This resulting value (e.g., a ratio) enables the simple and efficient calculation of an amount of matter blocking the observer from seeing the markup pixel(s). If this amount is small, then the markup is minimally obscured (if at all), and if the amount is large, the markup is substantially (or completely) obscured. Thus, if an object that appears distant in the scene (e.g., zoomed out) and is in front of the markup, the markup will be drawn more clearly (visible through the occluding pixel), whereas if the same object appears close in the scene (e.g., zoomed in) and is in front of the markup, the markup is rendered faint, if drawn at all.

The disclosed architecture finds applicability to computer gaming systems as well, where depth fading and markup find use in providing an enhanced user experience. For example, a targeted object "hidden" behind a hiding (or occluding) object, yet a "farther" distance away from a player/user, can be drawn with some degree of visibility (e.g., an outline) by drawing some or all of the occluded pixels of the hidden object with full opacity. As the distance from the user to the hiding object decreases, the occluded pixels of the hidden object are drawn with less opacity, if not with zero opacity, thereby preventing the player from seeing the hidden targeted object at all.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include a contribution component 102 configured to compute a markup contribution amount 104 of markup 106 (e.g., text, line, graphic, etc.) and a scene contribution amount 108 of a scene 110 based on a (camera) view 112 of the scene 110 and location of the markup 106 established in the scene 110. A fade component 114 can be configured to apply a level of depth fading 116 to markup (of the markup 106) and scene objects based on the contribution amounts (104 and 108) of the corresponding markup 106 and scene 110 as the (camera) view 112 changes (e.g., zoom in, zoom out, pan in any direction, move position of the camera relative to the scene 110, etc.).

Here, a building 118 is an occluding (scene) object that occludes some part of the markup 106 as perceived from the perspective of the view 112 at a view location A. As the view 112 changes by moving closer to the scene 110 (a zoom-in effect to the viewer) at a view location B, the level of fading 116 (also referred to as opacity) applied to either or both of the building 118 or/and the markup 106 changes as well. As described herein, the changes in the level of fading 116 corresponds to the change in the view 112, as defined according to pixel distances relative to the markup pixels and occluding pixels of the building 118, for example.

The contribution component 102 and the fade component 114 interface to a rendering component 120 such as provided in graphics adapters and/or onboard graphics subsystems (e.g., motherboard mounted chips) and powered by GPUs (graphical processing units) and/or the motherboard processor core(s).

It is to be understood that in the disclosed architecture, certain components may be rearranged, combined, omitted, and additional components may be included. Additionally, in some embodiments, all or some of the components are present on the graphics adapter and/or the client, while in other embodiments some components may reside on a server or are provided by a local or remove service. For example, in a server implementation, map views can be pre-rendered and processed according to the disclosed architecture for depth fading on a server (e.g., the "cloud") and sent down to the client as bitmaps.

In another embodiment, the contribution component 102 can be configured to compute a dominant contribution between markup 106 of the scene 110 and a scene object (the building 118) of the scene 110, based on the markup contribution amount 104 of the markup 106 and scene contribution amount 108. The markup contribution amount 104 and the scene contribution amount 108 are computed to determine utility 122 of the markup 106 or the scene object (the building 118) to a viewer (e.g., user) for the given view 112 of the scene 110. In other words, it may be more beneficial or important to the viewer to see the markup 106 than the scene object (the building 118) in front of the markup 106. However, the utility 122 can change based on the distance to the camera at view location A and view location B.

The fade component 114 can be configured to apply a level of depth fading to the markup 106 based on the utility 122 to the viewer to perceive the markup 106 relative to a location of the scene object of the given view 112.

The markup contribution amount and the scene contribution amount are computed on a per pixel basis and the depth fading is applied on a per pixel basis. The contribution component computes a ratio of distances of an obscuring pixel and a markup pixel to a virtual camera from which the scene is viewed, and the contribution component computes an amount of scene matter, as the scene contribution amount, that blocks an observer from viewing the markup.

The markup 106 is drawn with greater prominence than the scene object (building 118), which is in front of the markup 106, when the markup contribution amount 104 indicates greater utility 122 of the markup 106 to the scene 110 than the scene object (building 118). The prominence depicted in the drawing is based on an applied level of depth fading. The markup 106 is drawn with less prominence than the scene object (building 118), which is in front of the markup 106, when the scene contribution amount 108 indicates greater utility 122 of the scene object to the scene 110 than the markup 106. The prominence depicted in the drawing is based on an applied level of depth fading.

Figure 2:
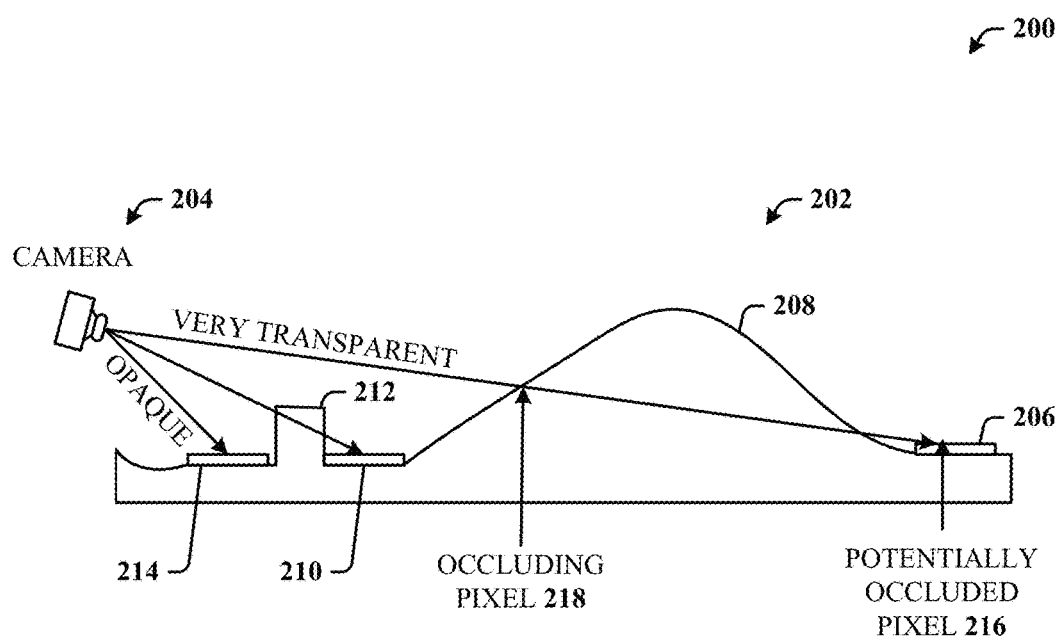
FIG. 2 illustrates a diagram of computing distances of markup and scene objects in a scene for depth fading.

FIG. 2 illustrates a diagram 200 of computing distances of markup and scene objects in a scene 202 for depth fading. The diagram 200 shows a camera 204 positioned relative to the scene 202. The camera 204 represents the elevation and angle at which the scene 202 is being viewed (e.g., by a user). In diagram 200, the scene 202 comprises scene objects that may, may not, or may partially, occlude pixels associated with other objects. The other objects can be markup or other scene objects, for example.

For example, consider the scene 202 where a first line 206 (e.g., in a map) marks a footpath that is one hundred meters behind a hill object 208 (the hill object 208 located between the camera 204 and the first line 206). If the camera 204 is one thousand meters away from the scene 202, the first line 206 may be displayed "through" the hill object 208 (from the perspective of the camera 204) with either no reduction in opacity (fully opaque) or a minimal reduction in opacity such that the viewing user may not notice. Thus, the utility to the user is to show the markup at this distance.

If the camera 204 is moved closer to the scene 202 (e.g., five hundred meters from the scene 202), the first line 206 may appear faded to some extent (e.g., some percentage of transparency or "partial opacity"). If the camera 204 is in a position closest to the scene 202 (e.g., one hundred meters from the first line 206), the first line 206 may not show at all, for the occluded pixels.

This technique applies equally to other markup and objects in the scene 202, such as for a second path or route marked by a second line 210 behind a building object 212, and a third path or route marked by a third line 214, but not obstructed at all via the camera 204. In this last case, as long as the camera 204 is not moved to the right of the building 212 and looking back on the third path or route in some occluded way, the third line 214 is presented as opaque.

If the camera 204 is moved closer to the scene 202 (e.g., five hundred meters from the scene 202), a second footpath (the second line 210) behind the building object 212 may appear faded to some extent (e.g., some percentage of transparency or "partial opacity"). If the camera 204 is one hundred meters from a third path (the third line 214), and the third path was occluded by some object (not shown), the third footpath (third line 214) may not show at all (a level of depth fading equivalent to zero opacity).

All potentially occluding objects in the scene (e.g., hill object 208, building object 212, etc.) have a pass rendered to calculate distance from the camera 204. For convenience and compatibility reasons, for example, the distance can be computed and written into a "distance" buffer for each pixel on the display (as part of the scene 202). When rendering all potentially occluded objects (e.g., the first line 206), the traditional depth buffer may not be utilized—the pixel distances from the camera 204 are calculated and stored in the distance buffer. Based on the objects in the scene 202 being rendered, this may be performed per-vertex, and interpolated for each pixel, and/or directly calculated per-pixel.

The occluding distance (the distance of occluding object, e.g., hill object 208) is then retrieved from the distance buffer and compared to other retrieved distances of other objects such as markup. If the distance of a potentially occluded pixel 216 (referred to as the occluded pixel distance) to the camera 204 is less than (closer to) the distance of an occluding pixel 218 to the camera 204, the potentially occluded pixel 218 is drawn at full opacity.

Alternatively, consider the ratio between the occluded pixel distance (distance from potentially occluded pixel 216 to the camera 204) and the distance between the potentially occluded pixel 216 and the occluding pixel 218. If this ratio is large (as may be determined programmatically according to some gradient or scale of thresholds or values), such that the camera 204 is much farther away than the pixels are from each other, the potentially occluded pixel 216 is drawn at full opacity. As the ratio decreases (the camera 204 moves closer to the scene 202), the opacity decreases to zero (i.e., zero transparency). The rate at which this ratio translates to a lowered (or changing) opacity can be controlled programmatically.

The exact behavior can vary for different data types, such that a line denoting a navigation path maintains opacity longer than the associated road, path, or route, for example.

Figure 3:
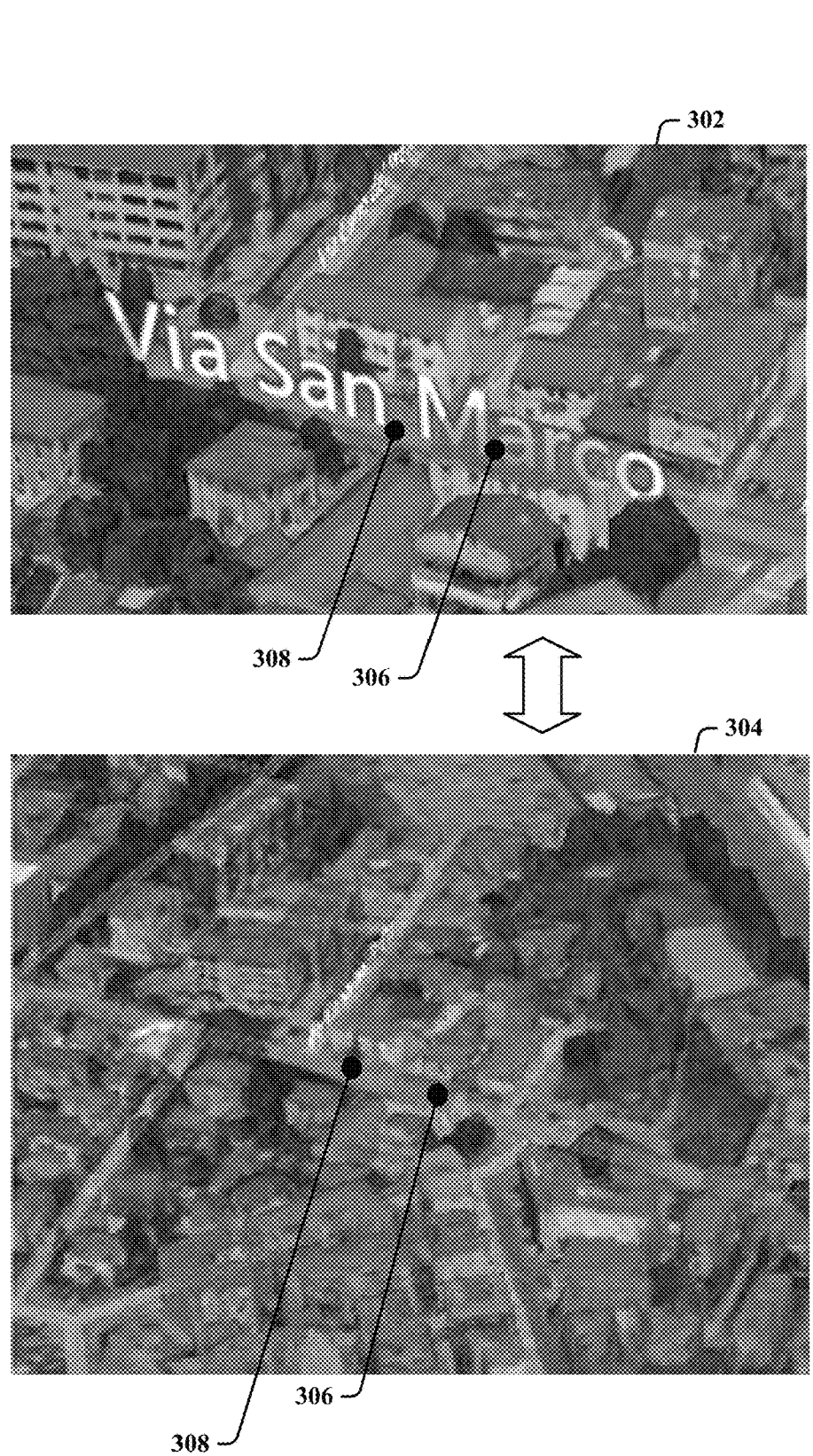
FIG. 3 illustrates screenshots of a close-in view of a scene and a more distant view of a more expansive scene.

FIG. 3 illustrates screenshots 300 of a close-in view 302 of a scene and a more distant view 304 of a more expansive scene. In the close-in view 302 note that the label (markup) "Via San Marco" is blended (faded) somewhat with a building 306 in front of the markup, and that a road 308 on which the markup is presented is also blended (faded) rather than completely obscured. The utility to the user is to not show the markup in this close-up view since the user is most likely well oriented to the geography and routes at this distance.

Note additionally, that in the more distant view 304 (a zoomed-out image), the road 308 is more pronounced, and thus, less obstructed (occluded) by the building. The utility to the user at this much greater distance is to show the markup in the view since the user is less likely to be oriented to the geography and routes at this distance and hence may be more interested in seeing the route markup to reach the desired destination or area. The fading enabled by the disclosed architecture occurs in realtime (processed in the timespan that the actual event is occurring) as the user changes the view.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
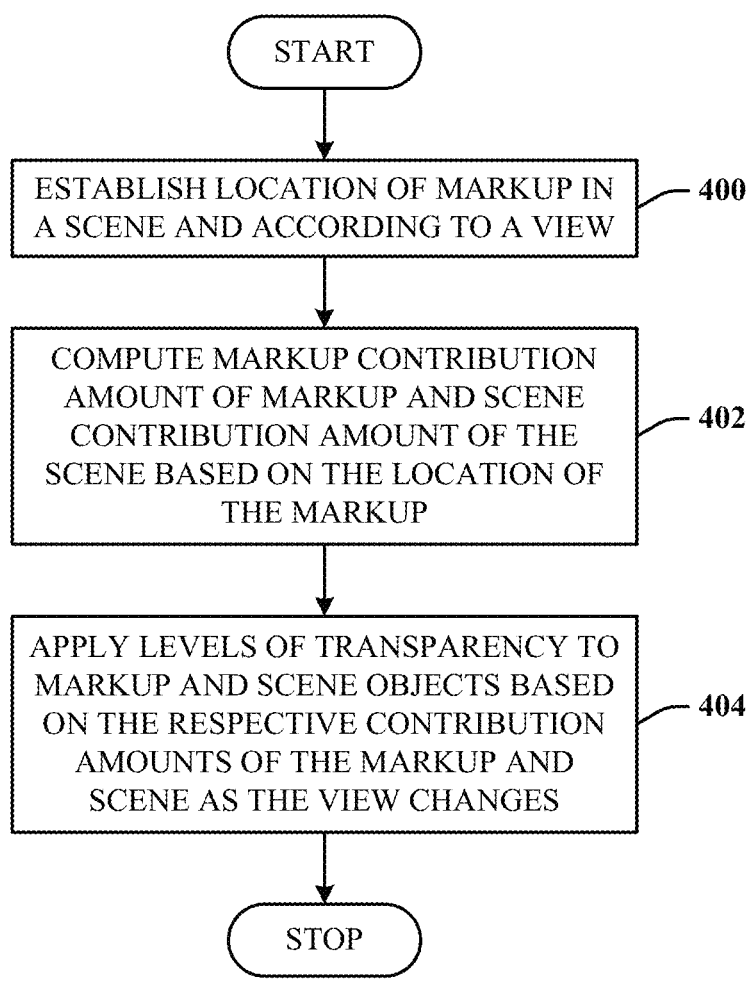
FIG. 4 illustrates a method in accordance with the disclosed architecture.

FIG. 4 illustrates a method in accordance with the disclosed architecture. At 400, the location of markup is established in a scene and according to a view. The view is determined by the perspective of a virtual camera, and the scene can be defined as all objects in the view or only those objects considered as providing some degree of occlusion of the markup. At 402, the markup contribution amount of markup and scene contribution amount of the scene are computed based on the location of the markup. At 404, levels of transparency are applied to markup and scene objects based on the respective contribution amounts of the markup and scene as the view changes.

Figure 5:
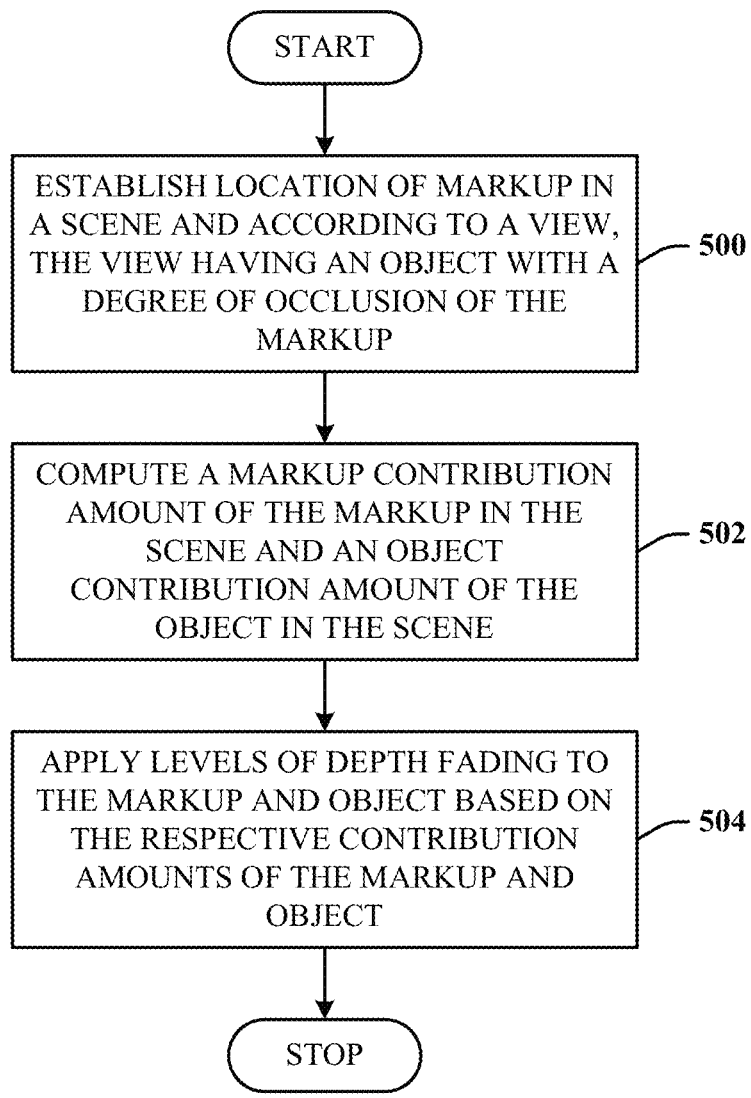
FIG. 5 illustrates an alternative method in accordance with the disclosed architecture.

FIG. 5 illustrates an alternative method in accordance with the disclosed architecture. At 500, location of markup in a scene (e.g., 3D) and according to a view (of a virtual camera), is established, the view having an object with a degree of occlusion (blocking) of the markup. At 502, a markup contribution amount of the markup in the scene is computed and an object contribution amount of the object in the scene is computed. The contribution amounts to the overall scene can indicate the percentage of which (degree) the markup occupies the scene and the occluding object occupies the scene. At 504, levels of depth fading are applied to the markup and object based on the respective contribution amounts of the markup and object. The depth fading is fading that is applied to one or both of the markup and the object based on the depth of the markup and object in the scene, and/or relative to each other.

The method can further comprise drawing the markup with greater prominence than the object if the object is in front of the markup and the object contribution amount is less than the markup contribution amount. The prominence is characterized by the amount of depth fading applied or not applied. For example, if the amount of depth fading is minimal, the object or markup is rendered clearly and with little or no transparency. If the amount of depth fading is great or significant, the object or markup to which the depth fading is applied is rendered with little clarity for the occluded portion such that the occluded portion is difficult to visually perceive in the view. Accordingly, the method can further comprise drawing the markup with less prominence than the object if the object is in front of the markup and the object contribution amount is greater than the markup contribution amount.

The method can further comprise computing the markup contribution amount relative to the overall scene and the object contribution amount relative to the overall on a per pixel basis. The method can further comprise computing a distance ratio that indicates an amount of object matter (or pixels of the object) occluding the markup. The method can further comprise adjusting the levels of depth fading applied to the markup and the object based on a zoom level of the view. In other words, the more distant the object and the markup appear in the scene, the less contribution amount the object may have. When considering no change in the zoom of the view, if the object in front of the markup is relatively small, the markup is drawn more clearly or prominently; whereas, if the object in front of the markup is relatively large, the markup is drawn less clearly or prominently, if at all.

The method can further comprise performing the acts of computing and applying on a per-pixel basis. The method can further comprise computing a distance ratio of a markup pixel of the markup obscured by the scene and applying the levels of depth fading based on the distance ratio.

Figure 6:
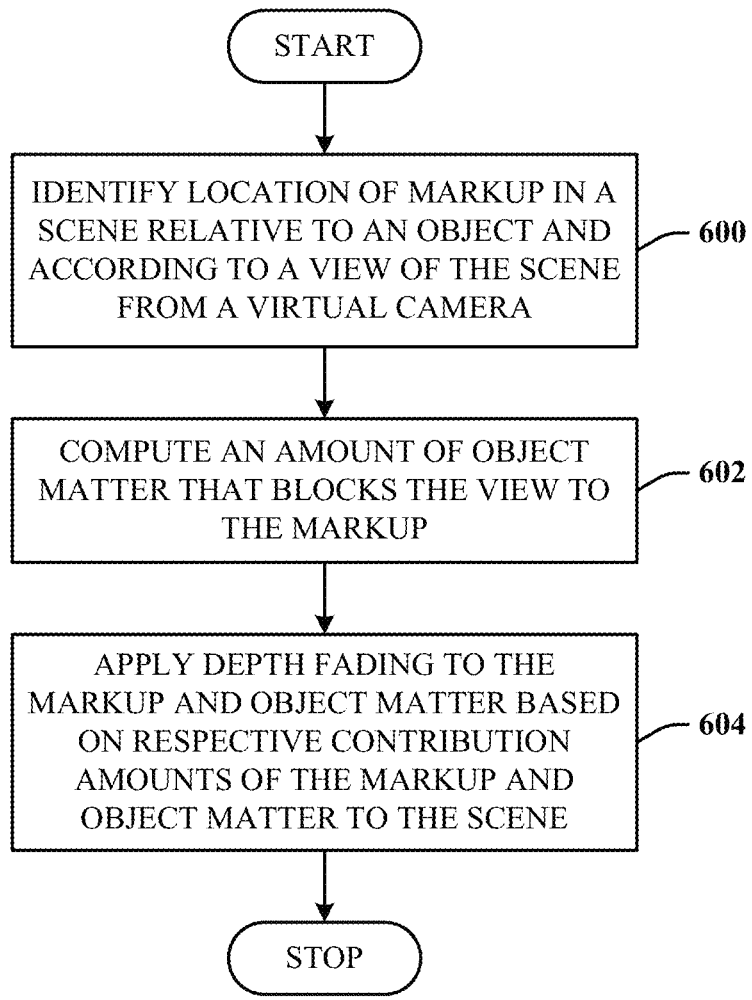
FIG. 6 illustrates still another alternative method in accordance with the disclosed architecture.

FIG. 6 illustrates still another alternative method in accordance with the disclosed architecture. The method can be embodied on a computer-readable storage medium as computer-executable instructions that when executed by a microprocessor, cause the microprocessor to perform the following acts. At 600, location of markup in a scene relative to an object and according to a view of the scene from a virtual camera, is identified. At 602, an amount of object matter that blocks the view to the markup, is computed. At 604, depth fading is applied to the markup and object matter based on respective contribution amounts of the markup and object matter to the scene.

The method can further comprise changing an amount of the depth fading applied to each of the markup and scene matter based on a change in the view. The method can further comprise applying less depth fading (e.g., more prominence) to the markup relative to depth fading applied to the object, when the object is viewed as in front of the markup and object pixel contribution to the scene is less than a scene threshold value. The threshold value can be a value that indicates when the pixel count of the markup and object as a metric to determine contribution.

The method can further comprise applying greater depth fading (e.g., less prominence) to the markup relative to depth fading applied to the object, when the object is viewed as in front of the markup and object pixel contribution to the scene is greater than a scene threshold value. The method can further comprise computing a distance ratio of a pixel of the object and a pixel of the markup relative to the virtual camera to determine a degree of obscurement of the markup. This computation is then performed for all pixels relevant to the object and the markup.

Figure 7:
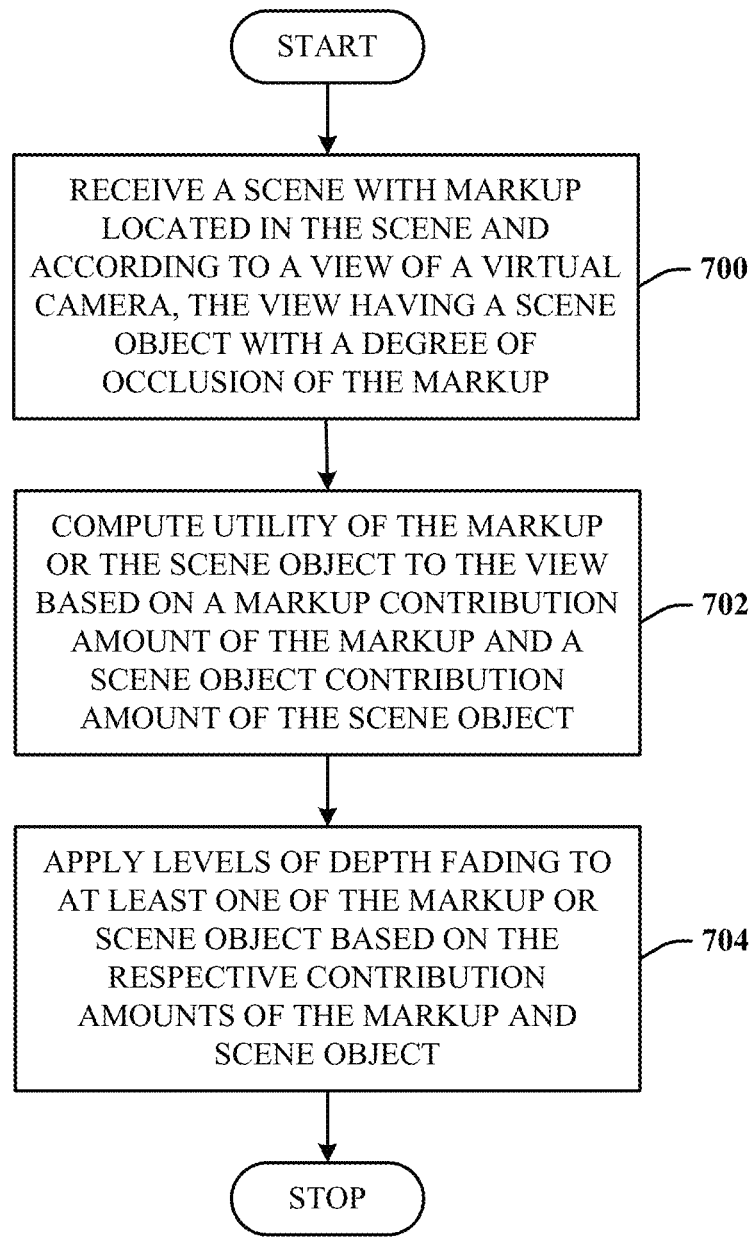
FIG. 7 illustrates yet another alternative method in accordance with the disclosed architecture.

FIG. 7 illustrates yet another alternative method in accordance with the disclosed architecture. At 700, a scene is received with markup located in the scene and according to a view of a virtual camera. The view includes a scene object with a degree of occlusion of the markup. At 702, utility of the markup or the scene object to the view is computed, based on a markup contribution amount of the markup and a scene object contribution amount of the scene object. At 704, levels of depth fading are applied to at least one of the markup or scene object based on the respective contribution amounts of the markup and scene object.

The method can further comprise drawing the markup with prominence and readability, if the scene object is in front of the markup and the markup is of greater utility in the scene than the scene object. The method can further comprise drawing the markup with less prominence than the scene object, if the scene object is in front of the markup and the scene object is of greater utility in the scene than the markup.

The method can further comprise computing the markup contribution amount to the scene and the scene object contribution amount to the scene on a per pixel basis. The method can further comprise computing a distance ratio that indicates an amount of object matter occluding the markup.

The method can further comprise adjusting the levels of depth fading applied to the markup, the scene object, or the markup and the scene object based on a zoom level of the view. The method can further comprise performing the acts of computing and applying on a per-pixel basis of occluding pixels of the scene object and occluded pixels of the markup. The method can further comprise computing a distance ratio as defined by distance between a markup pixel of the markup and scene object pixel of the scene object, and distance to a virtual camera from which the scene is being viewed, and applying the levels of depth fading based on the distance ratio.

Figure 8:
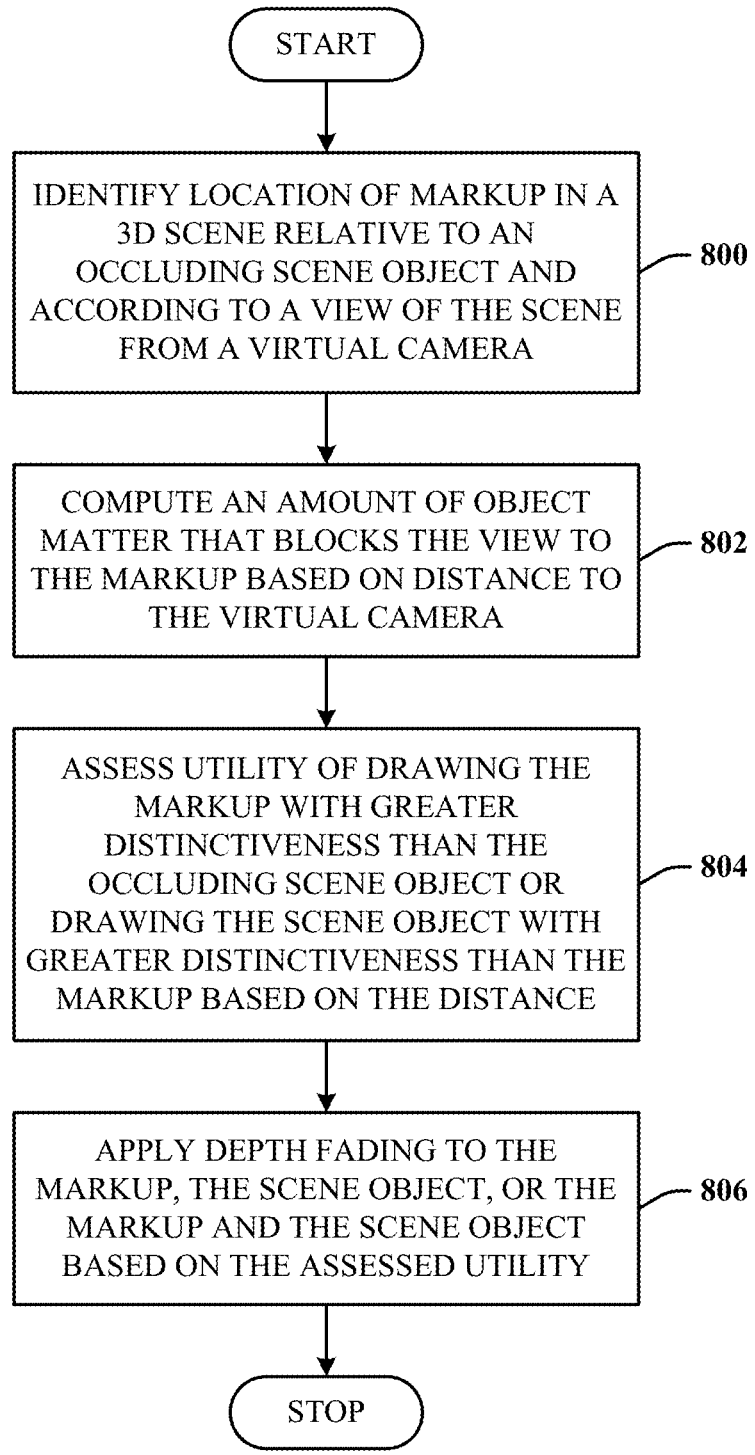
FIG. 8 illustrates another alternative method in accordance with the disclosed architecture.

FIG. 8 illustrates another alternative method in accordance with the disclosed architecture. The method can be embodied on a computer-readable storage medium as computer-executable instructions that when executed by a microprocessor, cause the microprocessor to perform the following acts.

At 800, location of markup is identified in a 3D scene relative to an occluding scene object and according to a view of the scene from a virtual camera. At 802, an amount of object matter that blocks the view to the markup is computed based on distance to the virtual camera. At 804, utility of drawing the markup with greater distinctiveness than the occluding scene object or drawing the scene object with greater distinctiveness than the markup, is computed, based on the distance. At 806, depth fading is applied to the markup, the scene object, or the markup and the scene object based on the assessed utility.

The method can further comprise changing an amount of the depth fading applied based on a change in the view and the utility. The method can further comprise applying depth fading equivalent to full opacity to the markup when the utility of the markup is greater than the utility of the scene object.

The method can further comprise applying depth fading equivalent to zero opacity to the markup when the utility of the scene object is greater than the utility of the markup. The method can further comprise assessing the utility based on a distance of a pixel of the object and a pixel of the markup relative to distance to the virtual camera to determine a degree of depth fading applied to the markup.

As used in this application, the terms "component" and "system" are intended to refer to a computer-related entity, either hardware, a combination of software and tangible hardware, software, or software in execution. For example, a component can be, but is not limited to, tangible components such as a microprocessor, chip memory, mass storage devices (e.g., optical drives, solid state drives, and/or magnetic storage media drives), and computers, and software components such as a process running on a microprocessor, an object, an executable, a data structure (stored in a volatile or a non-volatile storage medium), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
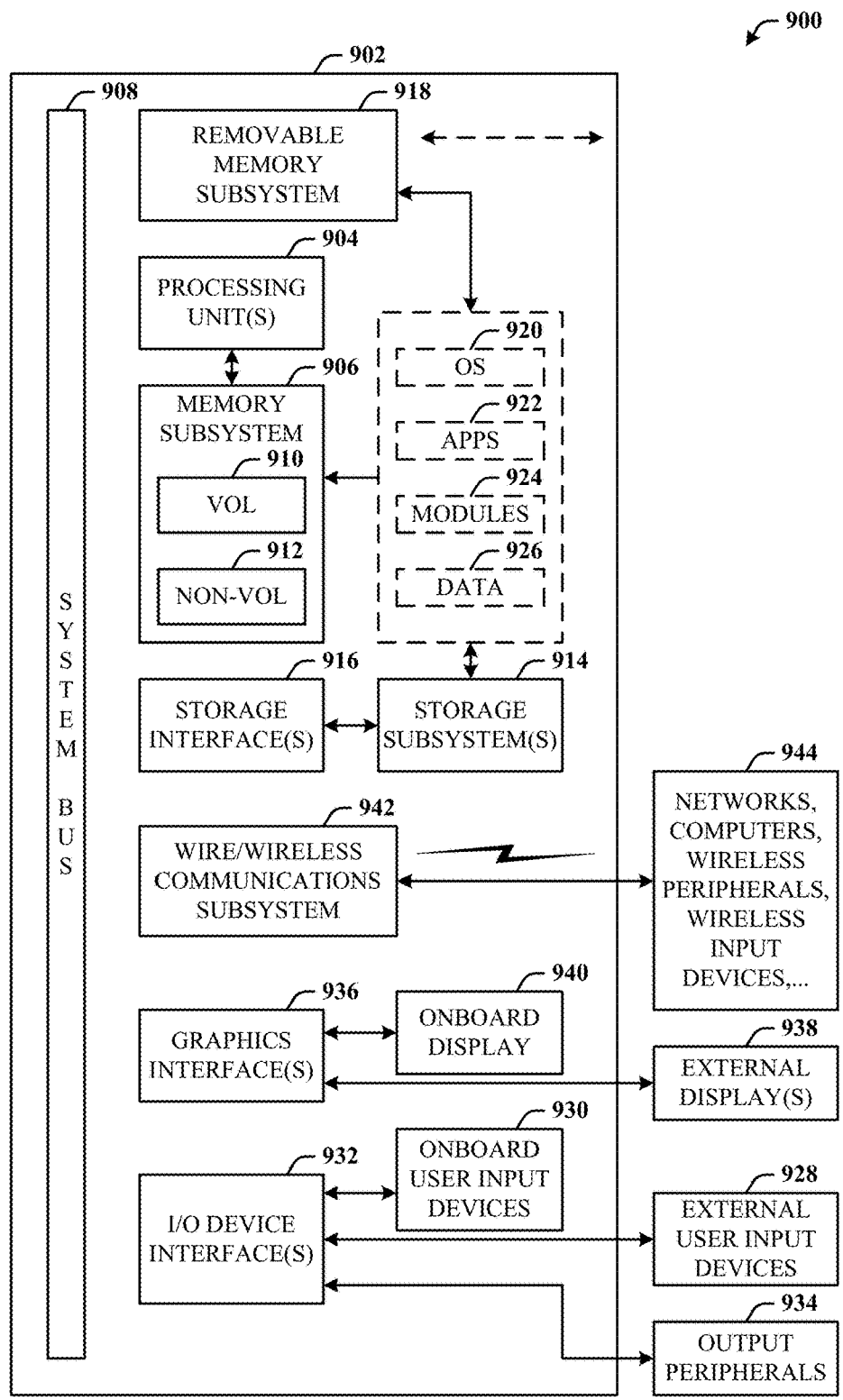
FIG. 9 illustrates a block diagram of a computing system that executes depth fading for scene markup in accordance with the disclosed architecture.

Referring now to FIG. 9, there is illustrated a block diagram of a computing system 900 that executes depth fading for scene markup in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 9 and the following description are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having microprocessing unit(s) 904 (also referred to as microprocessor(s) and processor(s)), a computer-readable storage medium such as a system memory 906 (computer readable storage medium/media also include magnetic disks, optical disks, solid state drives, external memory systems, and flash memory drives), and a system bus 908. The microprocessing unit(s) 904 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 902 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 906 can include computer-readable storage (physical storage) medium such as a volatile (VOL) memory 910 (e.g., random access memory (RAM)) and a non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the system memory 906 to the microprocessing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes machine readable storage subsystem(s) 914 and storage interface(s) 916 for interfacing the storage subsystem(s) 914 to the system bus 908 and other desired computer components and circuits. The storage subsystem(s) 914 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a machine readable and removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

Generally, programs include routines, methods, data structures, other software components, etc., that perform particular tasks, functions, or implement particular abstract data types. All or portions of the operating system 920, applications 922, modules 924, and/or data 926 can also be cached in memory such as the volatile memory 910 and/or non-volatile memory, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 902, and include volatile and non-volatile internal and/or external media that is removable and/or non-removable. For the computer 902, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 902, programs, and data using external user input devices 928 such as a keyboard and a mouse, as well as by voice commands facilitated by speech recognition. Other external user input devices 928 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 902, programs, and data using onboard user input devices 930 such a touchpad, microphone, keyboard, etc., where the computer 902 is a portable computer, for example.

These and other input devices are connected to the microprocessing unit(s) 904 through input/output (I/O) device interface(s) 932 via the system bus 908, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The graphic(s) interfaces 936 alone or in some combination with in the operating system 920, one or more application programs 922, other program modules 924, and/or program data 926 can include entities and components of the system 100 of FIG. 1, entities and components of the diagram 200 of FIG. 2, entities of the screenshots 300 of FIG. 3, and the methods represented by the flowcharts of FIGS. 4-8, for example.

The computer 902 can operate in a networked environment (e.g., IP-based) using logical connections via a wired/wireless communications subsystem 942 to one or more networks and/or other computers. The other computers can include workstations, servers, routers, personal computers, microprocessor-based entertainment appliances, peer devices or other common network nodes, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory for storing instructions that, when executed by the processor, causes the processor to:
compute, for a given view of a scene, a dominant contribution between a markup of the scene and a scene object of the scene based on a determined markup contribution amount and a scene contribution amount, wherein the markup contribution amount and the scene contribution amount are computed to determine a utility of the markup when compared to the scene object, and wherein the utility is based, at least in part, on:
a view of a virtual camera associated with the view of the scene; and
on a ratio of a distance from an occluded pixel of the markup to the virtual camera and a distance from a corresponding occluding pixel of the scene object to the virtual camera; and
apply a level of opacity to the markup based on the determined utility relative to a location of the scene object of the given view when the markup and the scene object are moved to be more distant from the virtual camera and the markup is located behind the scene object with respect to the virtual camera and wherein the level of opacity causes the markup to be more visible than the scene object due to changes of the ratio.

2. The system of claim 1, wherein the markup contribution amount and the scene contribution amount are computed on a per pixel basis and the level of opacity is applied on a per pixel basis.

3. The system of claim 1, wherein the scene is a three-dimensional (3D) scene.

4. The system of claim 1, wherein the processor is further configured to compute an amount of scene matter, as the scene contribution amount, that blocks an observer from viewing the markup.

5. The system of claim 1, wherein the markup is drawn with greater prominence than the scene object, which is in front of the markup, when the markup contribution amount indicates greater utility of the markup to the scene than the scene object, the prominence being based on an applied level of opacity.

6. The system of claim 1, wherein the markup is drawn with less prominence than the scene object, which is in front of the markup, when the scene contribution amount indicates greater utility of the scene object to the scene than the markup, the prominence being based on an applied level of opacity.

7. The system of claim 1, wherein the scene is a three-dimensional scene.

8. The system of claim 1, wherein moving the markup and the scene object to be more distant from the virtual camera comprises performing a zoom operation.

9. A method for rendering objects on a display, comprising:
receiving a scene with a markup located in the scene and according to a view of a virtual camera, the view having a scene object that occludes at least a portion of the markup;
computing a utility of the markup and a utility of the scene object to the view based, at least in part, on a markup contribution amount of the markup and a scene object contribution amount of the scene object, wherein the utility of the markup and the utility of the scene object are computed based, at least in part, on a ratio of a distance from an occluded pixel of the markup to the virtual camera and a distance from a corresponding occluding pixel of the scene object to the virtual camera;
comparing the utility of the markup and the utility of the scene object; and
when it is determined that the utility of the markup is greater than the utility of the scene object, applying a level of opacity to the markup when the markup and the scene object are moved to be more distant from the virtual camera and the markup is located behind the scene object with respect to the virtual camera and wherein the level of opacity causes the markup to be more visible than the scene object due to changes of the ratio.

10. The method of claim 9, further comprising drawing the markup with prominence and readability, if the scene object is in front of the markup and the utility of the markup is greater than the utility of the scene object in the scene.

11. The method of claim 9, further comprising drawing the markup with less prominence than the scene object, if the scene object is in front of the markup and the utility of the scene object is greater than the utility of the markup in the scene.

12. The method of claim 9, further comprising computing the markup contribution amount to the scene and the scene object contribution amount to the scene on a per pixel basis.

13. The method of claim 9, further comprising adjusting the levels of opacity applied to the markup, the scene object, or the markup and the scene object based on a zoom level of the view.

14. The method of claim 9, wherein the scene is a three-dimensional scene.

15. The method of claim 9, wherein moving the markup and the scene object to be more distant from the virtual camera comprises performing a zoom operation.

16. A system, comprising:
at least one processor; and
a memory coupled to the at least one processor and storing instructions that, when executed by the at least one processor, perform a method, comprising:
identifying a location of a markup in a three-dimensional scene relative to an occluding scene object and according to a view of the scene from a virtual camera;
computing an amount of the scene object that at least partially blocks the markup based, at least in part, on a distance between the markup and the virtual camera;
determining a utility of the markup with respect to a utility of the scene object based on the distance, wherein the utility of the markup and the utility of the scene object are computed based, at least in part, on a ratio of a distance from an occluded pixel of the markup to the virtual camera and a distance from a corresponding occluding pixel of the scene object to the virtual camera; and
applying a level of opacity to at least one of the markup and the scene object based, at least in part on the determined utility of the markup and the determined utility of the scene markup wherein the level of opacity is applied to the markup when the markup and the scene object are moved to be more distant from the virtual camera and the markup is located behind the scene object with respect to the virtual camera and wherein the level of opacity causes the markup to be more visible than the scene object due to changes of the ratio.

17. The system of claim 16, further comprising instructions for changing the level of opacity applied based, at least in part, on a change in the view and at least one of the utility of the markup and the utility of the scene markup.

18. The system of claim 16, further comprising instructions for applying a level of opacity equivalent to full opacity to the markup when the utility of the markup is greater than the utility of the scene object.

19. The system of claim 16, further comprising instructions for applying a level of opacity to zero opacity to the markup when the utility of the scene object is greater than the utility of the markup.

20. The system of claim 16, wherein determining the utility of the markup with respect to the utility of the occluding scene object comprises determining the utility of the markup with respect to the utility of the occluding scene object on a per pixel basis.

* * * * *